United States Patent [19]

Okano et al.

[11] Patent Number: 4,853,781
[45] Date of Patent: Aug. 1, 1989

[54] VIDEO FORMAT SIGNAL PROCESSING SYSTEM

[75] Inventors: Takashi Okano; Toru Akiyama; Masao Kanda, all of Saitama, Japan

[73] Assignee: Pioneer Electronic Corporation, Tokyo, Japan

[21] Appl. No.: 166,350

[22] Filed: Mar. 10, 1988

[30] Foreign Application Priority Data

Mar. 16, 1987 [JP] Japan ................................. 62-61495

[51] Int. Cl.$^4$ .............................................. H04N 5/04
[52] U.S. Cl. .................................... 358/148; 358/149
[58] Field of Search ..................... 358/148, 17, 19, 13, 358/160, 339, 337, 320, 149; 360/36.1, 36.2; 375/119

[56] References Cited

U.S. PATENT DOCUMENTS 4,109,276  8/1978  Hopkins, Jr. et al. ................ 358/19
4,439,786  3/1984  Claydon et al. ..................... 358/148
4,468,698  8/1984  Kavoussi et al. .................... 358/357

FOREIGN PATENT DOCUMENTS 0152138  8/1985  Japan ................................. 375/119

Primary Examiner—James J. Groody
Assistant Examiner—David E. Harvey
Attorney, Agent, or Firm—Sughrue, Mion, Zinn, Macpeak & Seas

[57] ABSTRACT

A video processing system in which data obtained from sampling an input video format signal according to a first timing signal is written into a first memory according to the first timing signal. Data is read-out of the first memory according to a second timing signal having a frequency equal to N times that of a horizontal synchronizing frequency of the input signal, thereby obtaining data with no time-base fluctuation. M-samples of data from the first memory is then written into a second memory, and data from the second memory is read-out such that the read-out signal from the second memory has a different phase than that of the input video format signal. The system is operable for simultaneously stopping data being read-out of the first memory and data being written into the second memory for a period of time equal to R+kM samples of the input video format signal, wherein R is an integer remainder of N/M, and k is either a positive integer or zero.

12 Claims, 4 Drawing Sheets

VIDEO FORMAT SIGNAL PROCESSING SYSTEM

TECHNICAL FIELD

The present invention relates to a video format signal processing system.

BACKGROUND OF THE INVENTION

A so-called video format signal, like that of a composite video signal, consists of successive field signals each having a picture information signal portion, horizontal and vertical synchronizing signal portions, and horizontal and vertical blanking signal portions. In general, a pair of field signals form one frame signal.

If a writing operation of an input video format signal into a picture memory is initiated at a first start time, and a reading-out operation of the written video format signal from the picture memory is initiated at a second start time (which is different from that of the first start time of the writing operation). it is possible to obtain a video format signal outputted from the picture memory which is different in phase from the video format signal inputted to the picture memory. In video format processing systems, the picture data which is written-into and read-out of the picture memory is obtained by sampling an input video format signal according to a predetermined period. In such processing systems, it is necessary (in order to increase the operating speed of the system) to provide a serial-to-parallel (hereinafter referred to as "S-P") converter, and a parallel-to-serial (hereinafter referred to as "P-S") converter, at the writing (input) and reading (output) sides of the picture memory, respectively. In such processing systems, the S-P conversion period is selected to be M times as long as the sampling period, wherein M-samples of the video format signal correspond to one address of the picture memory. Further, it is desirable to select the time-length of the picture data stored in one address of the picture memory to be equal to or an integer times as long as a subcarrier period, thereby allowing sufficient time to take into account those situations where special effects (e.g. reduction, enlargement, displacement, dropout-correction, etc.) of the picture data is performed. More particularly, in such situations, picture data is read-out of the memory according to a sequence of addresses which is different from that in a normal reading operation. Further, the time-length of the picture data stored in one address is selected to take into account those situations where picture data from the memory is subjected to some operation (e.g. some arithmetic operation is performed on the data).

Referring now to FIG. 1, there is shown a conventional video format signal processing circuit. In FIG. 1, an analog input video format signal (e.g. a signal which has been read-out from a video disk), is first sampled, and then quantized by an A/D (analog-to-digital) converter 1, thereby converting the analog input video signal into a digital signal. The digitized video format signal is then supplied to a S-P converter 2 so that the samples of the video format signal are combined into sets of M-samples. The sets of M-samples are then successively written (in the form of set of M-samples by set of M-samples) into respective addresses of a picture memory 3. Data of M-samples from the picture memory 3 is then successively read-out from the respective addresses of the memory in the order in which the data (of M-samples) was written into the respective addresses of the memory 3. The data of each set of M-samples read-out from the picture memory 3 is then supplied to a P-S converter 4 for successively supplying data of one sample (after data of one sample) into a D/A (digital-to-analog) converter 5. The data received by the D/A converter 5, from the P-S converter 4, is successively converted into an analog output video format signal having a phase which is different from that of the input video format signal. The video format processing system of FIG. 1 includes a controller 6 for controlling the timing of the processing system. The controller 6 is designed to generate conversion clocks a and b which are supplied to the S-P converter 2, and to the P-S converter 4, respectively. The controller 6 also generates a quantizing clock c which is supplied to the A/D converter 1.

In order for the system of FIG. 1 to perform high-speed data input/output, and in order to simplify the system, it is preferable to design the processing system such that the S-P converter 2 and the P-S converter 4 alternately operate. In other words, it is preferable to design a processing system in which either the S-P converter 2 or the P-S converter 4 operates at a given time, thereby allowing, for example, data to be subjected to S-P conversion while the P-S conversion is stopped, and vice-a-versa.

FIG. 2 shows the timing scheme for alternately or selectively controlling the S-P converter 2 and the P-S converter 4. More particularly, waveform (A) of FIG. 2 shows the timing for clock a, and waveform (B) shows the timing for clock b. As shown in FIG. 2, data is converted by the S-P converter 2 at the leading edge (L.E.) of the clock a. At that time (i.e. L.E. of clock a). data is written into the picture memory 3. On the other hand, data of 8-samples is read-out of the picture memory 3 and then is transferred to the P-S converter 4 at the leading edge of clock b. As shown in FIG. 2, clock b is shifted in phase from clock a by one-half of an 8-sample period. The data (of one set of 8-samples after data of one set of 8-samples) outputted from the P-S converter (i.e. L.E. of clock b). is successively supplied to the D/A converter 5 in response to a clock d which has the same frequency as that of the quantizing clock c (FIG. 1).

When the writing and reading operations are controlled according to the above timing scheme, the frequency of the clock c for quantizing a video format signal is selected to be, for example, 910 times the video horizontal frequency of the input video signal. Further, the period M of the S-P and the P-S conversion is selected to be 8 times that of the quantizing clock c so that the time length of data stored in one address of the memory is an integral multiple of the subcarrier period. However, when selecting the above values for the clock and period M. synchronization problems result.

More particularly, in order to perform writing and reading operations alternately into and out of a picture memory, it is necessary to make the frequency $f_c$ of the quantizing clock c divisible by the period M of the S-P and P-S conversion such that the quotient of $(f_c \div M)$ is an integer. In the processing system described above, the frequency of the quantizing clock c was selected to be 910 times the horizontal line frequency of the video signal, and the period M was selected to be 8 samples. However, if 910 is divided by 8, the resulting quotient is 113.75 (which is not an integer). and therefore the writing and reading operations cannot be alternately and successively carried-out. Therefore, in order to make the resulting quotient equal to an integer, it is necessary to design a processing system which can consider only a section of data (i.e. data composed of samples which are integer times as many as 8). One such system would include 904 samples (904÷8=113) for each horizontal period. In such a system, a portion of data (i.e. 904 samples) is written into the picture memory and the data of the remaining 6-samples (i.e. 910−904=6) is simply omitted.

In order for a processing system to handle only a section of data of each horizontal period, a timing scheme as shown in FIG. 3 has been proposed, wherein waveform (A) of FIG. 3 represents an input video format signal, and waveform (B) represents clock a of FIG. 1. More particularly, clock a is inhibited or stopped when the writing operation of 904 samples has occurred (point of time $t_1$). and the starting of the S-P conversion period is reset by a write-in starting pulse generated from a horizontal synchronizing signal or a burst signal of the input video format signal (point of time $t_2$). Thus, the video data can be written into predetermined addresses of the memory under the condition that each data portion corresponding to 8 quantizing or sampling clocks is to be stored into one address of the memory. FIG. 4 shows an enlarged diagram of clock a in a period including the points of time $t_1$ and $t_2$ of FIG. 3. As shown in FIGS. 4, 6 samples of the video occur within the interval between times $t_1$ and $t_2$, and are not written into the memory.

As shown in FIG. 5, waveforms (A) and (B) represent the video format signals e, and f, which are written-into, and read-out of the picture memory 3, respectively, and which have a phase difference therebetween corresponding to a difference between the writing and the reading addresses of the picture memory 3, and the so-called synchronization conversions are performed according to the phase difference. FIGS. 6–8 show the periods of S-P and P-S conversion for the synchronization conversion. In FIGS. 7 and 8, a reset position (point of time $t_3$) of the write-in starting point, and a reset position (point of time $t_4$) of the read-out, starting point are shown which correspond to FIG. 5. FIG. 6 shows the waveforms (A) and (B) of the clocks a and b, respectively. FIG. 7 is an enlarged diagram, wherein waveforms (A) and (B) show the clocks a and b, respectively, in a period including the point of time $t_3$, and FIG. 8, is enlarged diagram showing the waveforms (A) and (B) of the clocks a and b, respectively, in a period of time including the point of time $t_4$. In the interval between the points of time $t_3$ and $t_4$, the clocks a and b are made to be anti-phase or opposite to each other, so that the data-writing and the data-reading operations into and out of the picture memory, respectively, can be alternately or selectively performed. Referring to FIG. 8, in the other sections or intervals (e.g. after time $t_4$), however, the anti-phase state is not maintained after the reset operation, so that the data writing-into and data reading-out operations of the picture memory 3 cannot be alternately performed.

In order to maintain the anti-phase relationship between clocks a and b outside of the interval between $t_3$ and $t_4$, it has been suggested that the clocks a and b be phase-modulated so that clocks a and b do not overlap each other outside of the interval between $t_3$ and $t_4$. Such a phase-modulating method has been used in broadcasting equipment; however, the phase-modulating method introduces problems into the processing system. More particularly, the phase-modulating method requires a complicated circuit arrangement for the memory controller, and further, the method requires high-speed components for the picture memory, the S-P converter, the P-S converter, the memory controller, etc. These high-speed components provide the required time for performing various timings, and necessarily increase the power consumption of the system.

Thus, there is a continuing need in the video format processing art for a system which can operate as indicated above, and which is relatively simple in design, and which does not consume a prohibited amount of power.

SUMMARY OF THE INVENTION

It is therefore an object of the present invention to provide a video format signal processing system in which the operations of writing data into a memory, and reading data out from the memory are alternately performed. Further, it is an object of the invention to provide a system which is of relatively simple design, and which does not require a prohibited amount of power.

The video format signal processing system according to the present invention accomplishes these and other objects by providing a processing system in which data is obtained by sampling an input video format signal according to a first timing signal which is synchronized with a time-base fluctuation of the input video format signal. Data is successively written into a first memory according to the first timing signal, and then data is successively read-out from the first memory according to a second timing signal having a frequency which is equal to N times the horizontal synchronizing frequency (N being a natural number) of the input video signal, thereby obtaining data having no time base fluctuation. The system of the present invention further includes a writing operation for successively writing data from the first memory into a second memory (in the form of successive groups of M-samples, wherein M is a natural number), and a reading operation for successively reading-out data from the second memory (in the form of successive groups of M-samples), wherein the writing-into, and the reading-out, of the data of the second memory are alternately performed, thereby obtaining an output video format signal having a phase which is different from that of the input video format signal. The system of the invention further includes means for simultaneously stopping the operation of reading data out of the first memory and the operation of writing data into the second memory for a period of time corresponding to (R+kM) samples. The period of time corresponding to (R+kM) samples occurs immediately before at least one horizontal scanning period has elapsed from the initiation of the data reading operation out of the second memory, wherein R is an integer remainder of N/M. and k is either a positive integer or zero.

DETAILED DESCRIPTION OF THE PREFERRED EMBODIMENT OF THE INVENTION

Referring now to FIGS. 9–12, an embodiment of the present invention will now be described in detail below.

Figure 1:
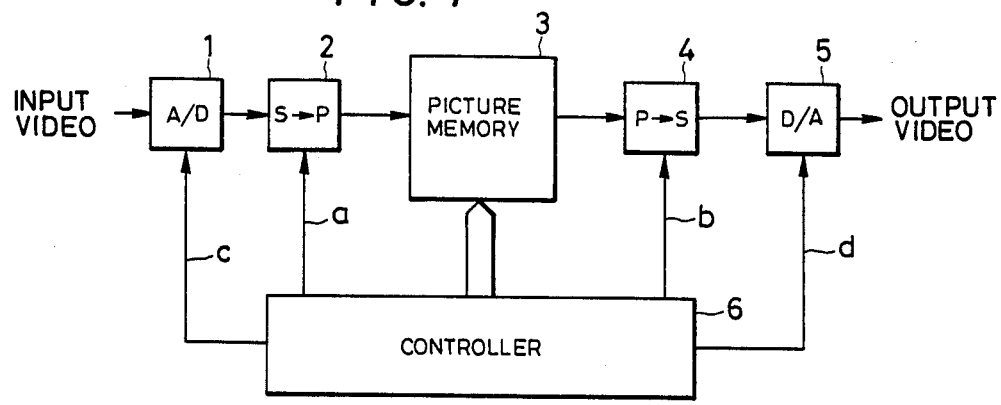
FIG. 1 is a block diagram of the circuit of a conventional processing system.
Figure 2:
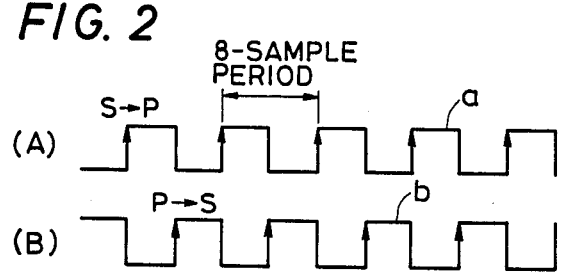
FIG. 2 is a waveform diagram for explaining the operation of the various portions of the circuit of FIG. 1.
Figure 3:
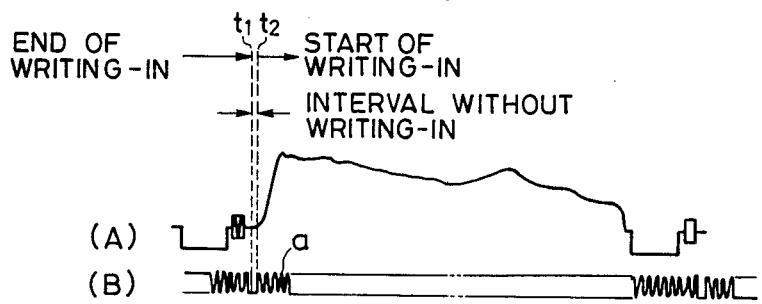
FIG. 3 is a waveform diagram showing the video format signal written into the picture memory of the circuit of FIG. 1, and the clock a of FIG. 1.
Figure 4:
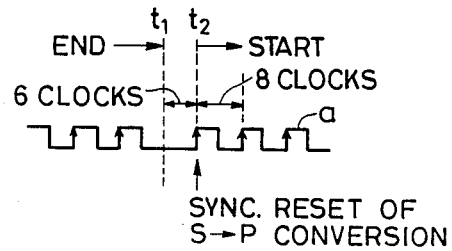
FIG. 4 is an enlarged diagram of a portion of the waveform a of FIG. 3.
Figure 5:
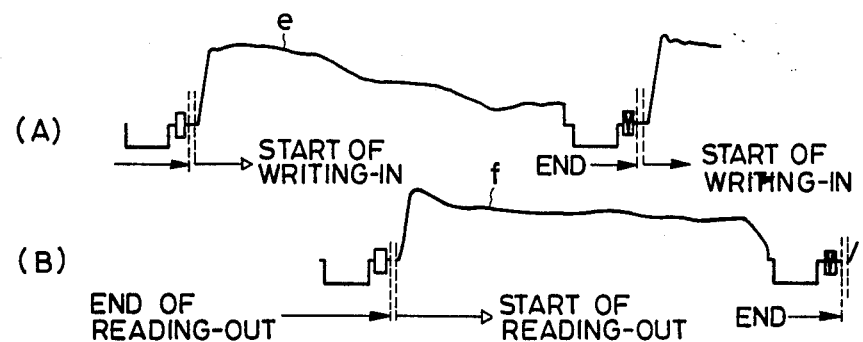
FIG. 5 is a waveform diagram of the video format signals written into and read-out of the picture memory 3 of the circuit of FIG. 1.
Figure 6:
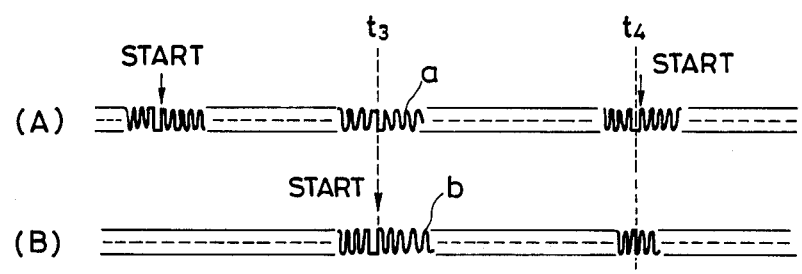
FIG. 6 is a waveform diagram of the clocks a and b of the circuit of FIG. 1.
Figure 7:
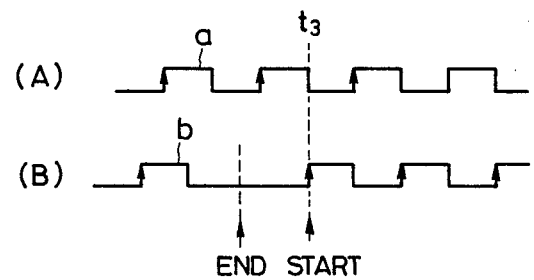
FIGS. 7 is an enlarged waveform diagram of a portion of the waveforms of FIG. 6.
Figure 8:
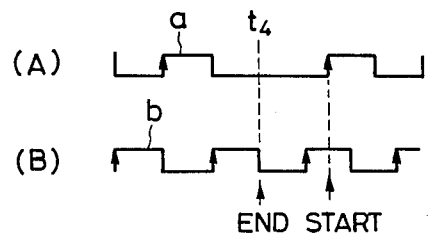
FIG. 8 is an enlarged diagram of a portion of the waveforms of FIG. 6.
Figure 9:
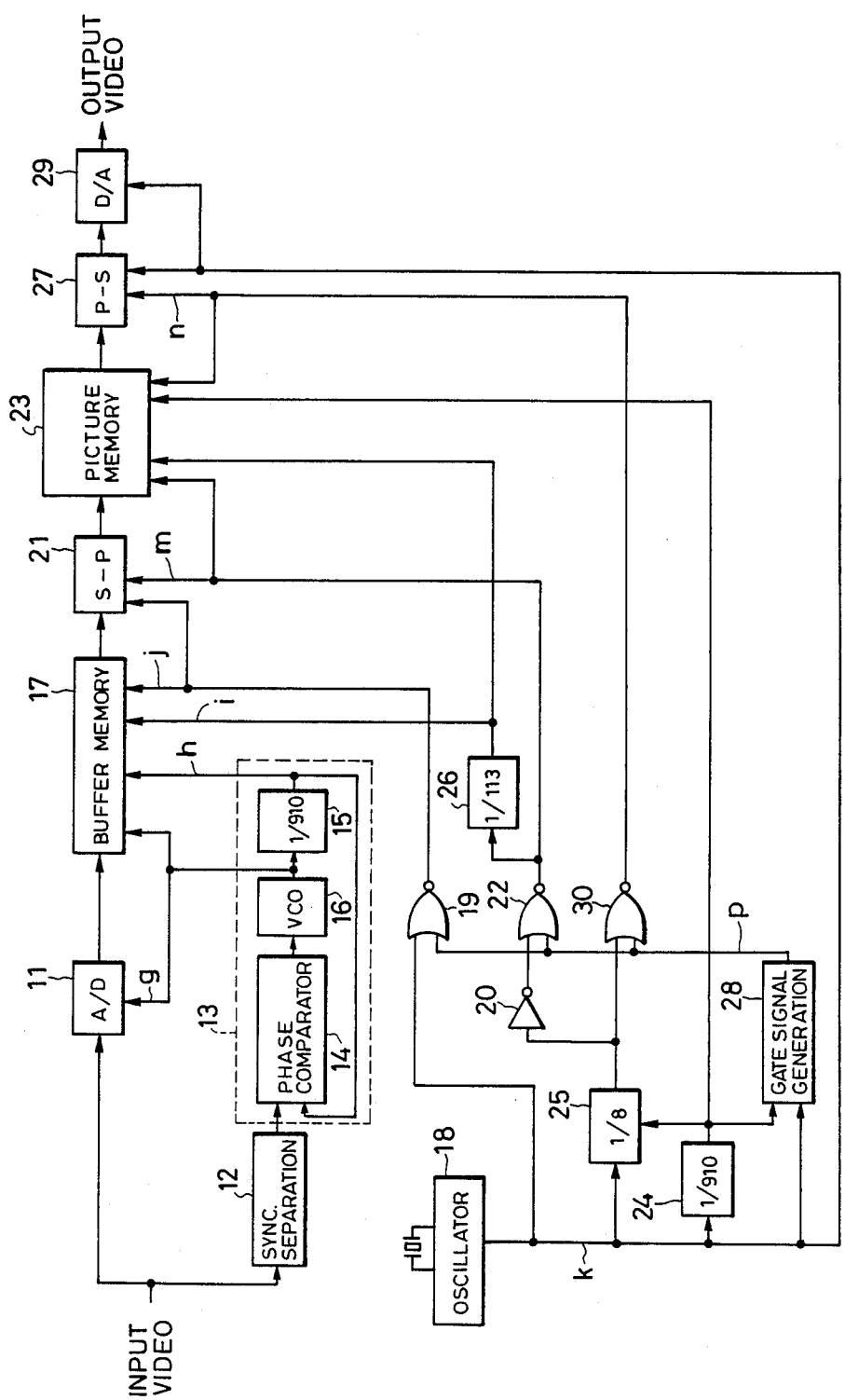
FIG. 9 is a block diagram showing an embodiment of the present invention.

In FIG. 9, a video format signal (e.g. a signal which has been read-out of a video disk). is supplied to an A/D converter 11 and a synchronization separator circuit 12. In circuit 12, a horizontal synchronizing signal contained within the video format signal is separated. The separated horizontal synchronizing signal is then supplied to a time-base control circuit 13. In the time-base control circuit 13, the horizontal synchronizing signal is supplied to a phase comparator 14 which subjects the signal to a phase comparison with an output signal of a divider 15, thereby producing a phase difference detecting signal corresponding to a phase difference between the horizontal synchronizing signal and the output signal of the divider 15. The phase difference detection signal is then supplied to a VCO (voltage-controlled oscillator) 16. The VCO 16 is designed to have a free-running frequency which is approximately equal to N times the frequency $f_H$ of the horizontal synchronizing signal (i.e. $N \times f_H$). The output of the VCO 16 is supplied to the divider 15 for dividing the output frequency of the VCO by N (i.e. output frequency of the VCO $\times 1/N$). The phase comparator 14, the divider 15, and the VCO 16 form a PLL (phase-lock loop). so that a signal which is in phase with a reproduced horizontal synchronizing signal is outputted from, the divider 15. The output of the divider 15 is supplied to a buffer memory 17, and serves as a write-in starting pulse h for buffer memory 17. A pulse which is in synchronization with a time-base fluctuation of the input video format signal is produced from the VCO 16. The output of the VCO 16 (i.e. the synchronized signal) is then supplied to the A/D converter 11 and to the buffer memory 17, and serves as both a quantizing clock g for the A/D converter 11, as well as a writing clock for the buffer memory 17.

In the A/D converter 11, the video format signal is sampled on the basis of the quantizing clock g, and a digital signal, corresponding to the sampled signal, is generated. The output data of the A/D converter 11 is then supplied to the buffer memory 17. A clock k having a frequency equal to $910 \times f_H$ is generated in a crystal oscillator 18, and is supplied to the buffer memory 17 as a reading clock j, through a NOR (not or) gate 19. The clock k is also supplied to a divider 25 for dividing an input frequency by 8. The output of the divider 25 is supplied to a divider 26 through an inverter 20 and a NOR gate 22. The divider 26 serves to divide the input frequency by 113. The output pulse of the divider 26 is supplied to the buffer memory 17, and serves as a read-starting pulse i. The buffer memory 17 consists of an FIFO picture line memory (e.g. µ PD 41101C) which allows writing and reading operations to be performed independently of each other and at the same time.

Digital video data produced from the A/D converter 11 is successively written into the buffer memory 17 according to the writing clock g. A sampling point of data to be written into a head address of the buffer memory 17 is determined by the write-in starting pulse h. If the read out starting pulse i is supplied to the buffer memory 17, data is successively read-out of the buffer memory 17 from the head address according to the reading clock j. The reading clock j is generated in the crystal oscillator 18, and has no disturbance in frequency, so that video data which has been subjected to a time-base correction is read-out of the buffer memory 17 according to the frequency of clock j.

The data read-out from the buffer memory 17 is supplied to an S-P converter 21. A pulse from the output of the NOR gate 22 is supplied, as a conversion clock m, to the S-P converter 21 together with the reading clock j. The S-P converter 21 consists of, among other things, a shift register, and is operable for successively holding a set of data of 8-samples read-out from the buffer memory 17 according to the reading clock j, and for outputting at the same time, according to the conversion clock m, the set of data of 8-samples which have been held. The output data from the S-P converter 21 is supplied to a picture memory 23.

The picture memory 23 is similar in design to the buffer memory 17, except that the picture memory 23 has a memory capacity which is sufficient to store data of one field. The picture memory 23 receives the read starting pulse i and the conversion clock m, as a write starting pulse, and a writing clock, respectively. The picture memory 23 further receives the output pulse of a divider 24 which serves to divide the frequency of clock k by 910. The output pulse of the divider 25 is supplied to memory 23 through a NOR gate 30. The output pulse of divider 24, and the output pulse of divider 25, serve as a read starting pulse, and as a reading clock, respectively.

In addition, the output pulse of the divider 24 serves as a reset pulse to the divider 25 and to a gating signal generation circuit 28. The gating signal generation circuit 28 includes a counter with a count value which is reset by the output pulse of the divider 24, and which is increased by the clock k, so that circuit 28 generates a clock gating signal p having a high voltage level (high logic level) during a period of time corresponding to 6 periods of the clock k from a point of time when the count value of the counter has become 904. The clock gating signal p, which is generated from the gating signal generation circuit 28, is supplied to one of the input terminals of each of the NOR gates 19, 22, and 30.

In FIG. 9, data of 8-samples read-out from the picture memory 23 is temporarily held in a P-S converter 27 according to a conversion clock n which is supplied to the picture memory 23 as a reading clock. Further, data is successively read-out from the P-S converter 27 (i.e. in the form of one sample after data of one sample) according to clock k. The successive output data of the P-S converter 27 is supplied to a D/A converter 29 for converting the data into an analog signal (i.e. a reproduced analog video signal is outputted from the D/A converter 29).

The output pulse of the divider 26 is supplied to a phase comparator (not shown), and serves as a reference signal for generating an error signal in a spindle servo apparatus which controls the rotational speed of a disk, thereby synchronizing the video format signal read from the buffer memory 17 with the input video format signal, according to a predetermined average phase difference therebetween.

Figure 10:
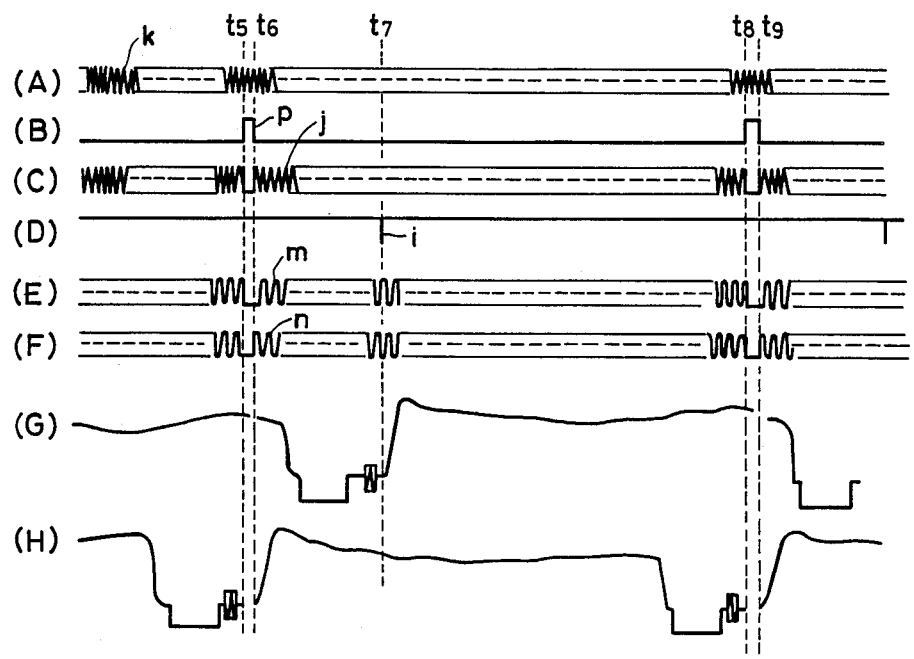
FIG. 10 is a waveform diagram for explaining the operation of the circuit of FIG. 9.
Figure 11:
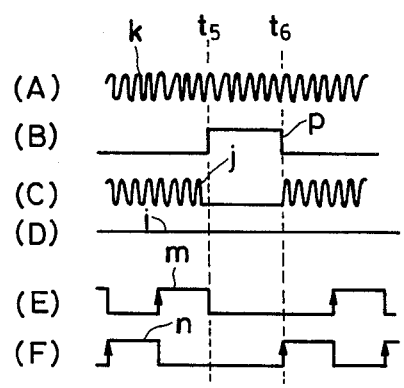
FIGS. 11 and 12 are enlarged diagrams of a portion of the waveforma of FIG. 10.
Figure 12:
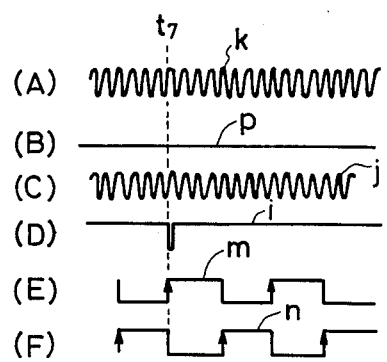

Referring now to FIGS. 10-12, the operation of the video format processing system of the invention will now be described.

In FIG. 10, waveform (A) shows the clock k; waveform (B) shows the clock gating signal p; waveform (C) shows the reading clock j; waveform (D) shows the read starting pulse i; waveform (E) shows the conversion clock waveform (F) shows the conversion clock n; waveform (G) shows a video format signal read-out from the buffer memory 17; and waveform (H) shows a video format signal produced from the P-S converter 27. Further, FIGS. 11 and 12 are enlarged diagrams showing the respective waveforms of the clock k, the clock gating signal p, the reading clock j, the read starting pulse i, and the conversin clocks m and n.

The reading operation out of the picture memory 23 is started according to the read-out starting pulse from the divider 24. The conversion clock acting as the reading clock of the picture memory 23 begins with a count of "1" and reaches 113 counts at time $t_5$. At this time of $t_5$, the clock gating signal p is generated. At $t_5$, the reading clock and the conversion clocks m and n are held at a low voltage level (low logic level), thereby stopping the data reading operation out of the buffer memory 17, as well as stopping the data writing and reading operations into and out of the picture memory 23. At this time, the clock input of the divider 26 is held at a low level, thereby preventing the count value of the divider 26 from changing. When the leading edge of the clock k has been generated 6 times after the point of time $t_5$, the clock gating signal p disappears (i.e. becomes a low voltage level at point of time $t_6$) so that the data reading operation out of the buffer memory 17, as well as the data writing and reading operations into and out of the picture memory 23 are restarted. At time $t_6$, the counter forming the divider 26 is restarted so that it begins to change its count value again. The divider 25 for generating the clock to be supplied to the divider 26 is reset by the read-out starting pulse of the picture memory 23, so that the timing for generation of the write-in starting pulse of the picture memory 23 is delayed by the period corresponding to 6-clocks in which the data reading operation out of the picture memory 23 is stopped. Thus, the data writing operation into the picture memory 23, and the data reading operation out of the buffer memory 17, are stopped in synchronism with the discontinuity of the data reading operation out of the picture memory 23 (which occurs every horizontal period). As a result, the data writing operation into the picture memory 23, and the data reading operation out of the memory 23, are always alternately performed (i.e. data is not written into memory 23 when data is read out of memory 23 and vice-a-versa).

At the time of discontinuity, the writing clock of the picture memory 23 generates discontinuous sections of the data writing operation in one video period. The discontinuity, however, does not mean that there is lack of video data to be written into the picture memory 23 in the video period, but only means the stopping of the data writing operation into the picture memory 23 during the period of discontinuity. This is apparent from the fact that the reading clock j to the buffer memory 17 is made to disappear in the period from the point of time $t_5$ to the point of time $t_6$, and then generated again after the point of time $t_6$, as shown in waveform (C) of FIG. 11.

Although the read-out starting pulse i to the buffer memory 17 is generated at the point of time $t_7$, the reading operation of video data to be written into the picture memory 23 from the buffer memory 17 is continuously carried-out without stopping at the point of time $t_7$. The period of reading data out of the buffer memory 17 is shortened by a period of time equal to the above-mentioned disappearance of the reading clock j.

A video format processing system has been described in which each discontinuous period of time (i.e. the period in which no data is written into the memory) of the data writing and reading operation into and out of the picture memory per horizontal section is selected to correspond to 6-samples, and the period in which data is written into the memory is selected to correspond to 904 samples, where the frequency of the quantizing clock k ($910 \times f_H$) is selected to be four times that of the color subcarrier. In practical cases, however, the present invention is not limited to the above-mentioned numerical values. The discontinuous period and the writing-into period may be selected to correspond to 14 samples, and 896 samples, respectively, or to correspond to 22 samples, and 888 samples, respectively. That is, the discontinuous period may be selected to correspond to $(kM+R)$ samples, wherein k is a positive integer or zero, and wherein R represents the remainder of N/M.

As described above, in the video format signal processing system according to the present invention, data is successively read-out of a first memory for time-base correction on the basis of a timing signal having a frequency equal to N times as high as a horizontal synchronizing frequency (N being a natural number), and where a writing operation for successively writing the obtained data into a second memory (in the form of M-samples after data of M-samples, wherein M is a natural number) and a reading operation for successively reading-out the written-data (in the form of M-samples after data of M-samples) are alternately performed. The data reading operation out of the first memory and the data writing operation into the second memory are stopped for a period of time corresponding to $(R+kM)$ samples immediately before at least one horizontal scanning period has elapsed from the initiation of the data reading operation out of the second memory, so that it is possible to alternately perform the data writing and reading operations into and out of the picture memory 23 at a predetermined timing even when N-samples of the video format signal in one horizontal section divided by M-samples of the input and output data into and out of the picture memory is not an integer. As a result, the circuit arrangement for controlling the picture memory can be made simple, and signal processing, such as time-base correction, synchronization conversion, etc. can be performed without using any high-speed components because the system allows time for signal processing. Further, if high speed parts are used, it is possible to produce a high-speed processing system which has not been realized in conventional processing systems. Moreover, the video format signal processing system according to the present invention may be implemented with small-scale circuit components, thereby reducing the power consumption of the system.

While a particular embodiment of the invention has been described above, those skilled in the art will understand that various modifications to the invention can be made. It should be understood that the invention is only limited by the scope of the following claims.

What is claimed:

1. A system for processing an input video format signal having a time-base fluctuation and having a horizontal synchronizing signal portion, comprising:
   means for synchronizing a first timing signal with the time-base fluctuation of the input video format signal;
   means for sampling the input video format signal according to said synchronized first timing signal;
   first and second memory means;
   means for writing the sampled input video format signal into said first memory means according to said synchronized first timing signal so that the written sampled input video format signal has no time-base fluctuation;
   means for reading-out data from said first memory means according to a second timing signal, said second timing signal having a frequency equal to N times a frequency of the horizontal synchronizing signal of the input video format signal;
   means for writing M samples of data read-out from said first memory means into said second memory means;
   means for reading-out data from said second memory means such that an output video format signal read-out from said second memory means has a phase which is different from that of the input video format signal; and
   means for activating said means for reading-out data from said first memory means and said means for reading-out data from said second memory means; and
   means for simultaneously inhibiting both said means for reading-out data from said first memory means and said means for writing data into said second memory means, said inhibiting means being activated within at least one horizontal scanning period after said means for reading-out data from said second memory means is activated, and said inhibiting means being activated for a period of time equal to R+kM samples of the input format video signal, wherein R is an integer remainder of N divided by M, and wherein k is one of a positive integer and zero.

2. The system according to claim 1, wherein said synchronizing means comprises:
   a synchronization separator circuit for separating the horizontal synchronizing signal from the input video signal: and
   a time-base control circuit connected to said synchronization separator circuit.

3. The system according to claim 1, further comprising serial-to-parallel converter means coupled between said first and second memory means; and
   means for receiving parallel data from said second memory means and for converting the parallel data from said second memory means into serial data.

4. The system according to claim 1, further comprising:
   an oscillator for generating a clock signal having a frequency equal to N times the frequency of the horizontal synchronizing signal of the input video format signal.

5. The system according to claim 1, wherein said means for writing data into said second memory means and said means for reading-out data from said second memory means are selectively by said activating means.

6. The system according to claim 2, wherein said time-base control circuit comprises, a divider circuit, a voltage-controlled oscillator connected to said divider circuit, and a phase comparator for receiving said separated horizontal synchronizing signal and an output of said divider circuit.

7. The system according to claim 3, further comprising, an analog-to-digital means for receiving the input video format signal and for supplying a digitized input video format signal to said first memory means, and digital-to-analog converter means for receiving parallel data from said second memory means and for supplying the output video format signal.

8. The system according to claim 4, further comprising counter means for counting a predetermined number of pulses of said clock signal, and for activating said inhibiting means in response to the predetermined number of clock signal pulses.

9. The system according to claim 4, further comprising means for dividing said clock signal by N, thereby producing a read-out starting pulse for said second memory means.

10. The system according to claim 4, further comprising means for dividing said clock signal by M, thereby producing a read-out clock for said second memory means.

11. The system according to claim 10, further comprising counter means for counting a predetermined number of pulses of said clock signal, and for activating said inhibiting means in response to the predetermined number of clock signal pulses, wherein said counter means is reset in response to said read-out clock for said second memory means.

12. The system according to claim 10, further comprising dividing means coupled to said means for dividing said clock signal by M and to said first and second memory means, said dividing means supplies a read-out starting pulse to said first memory means, and a writing start pulse to said second memory means.

* * * * *